US005550733A

United States Patent [19]

Yun et al.

[11] Patent Number: 5,550,733

[45] Date of Patent: Aug. 27, 1996

[54] VELOCITY CONTROL METHOD FOR PREVENTING OSCILLATIONS IN CRANE

[75] Inventors: Ji-Seop Yun; Byung-Seok Park; Jae-Seol Lee; Hyun-Su Park, all of Daejeon-Si, Rep. of Korea

[73] Assignee: Korea Atomic Energy Research Institute, Daejeon-Si, Rep. of Korea

[21] Appl. No.: 246,337

[22] Filed: May 19, 1994

[30] Foreign Application Priority Data

Mar. 25, 1994 [KR] Rep. of Korea ........................ 94-6026

[51] Int. Cl.$^6$ .................................................... G05B 11/32

[52] U.S. Cl. ...................... 364/174; 364/424.07; 212/272

[58] Field of Search .............................. 364/174, 167.01, 364/424.07; 212/147, 148, 132, 161, 146, 159, 205, 270, 150, 153, 155, 149, 272, 273, 284, 328, 329

[56] References Cited

U.S. PATENT DOCUMENTS

| | | | |
|---|---|---|---|
| 3,921,818 | 11/1975 | Yamagishi | 212/132 |
| 4,953,723 | 9/1990 | Saotome et al. | 212/159 |
| 5,127,533 | 7/1992 | Virkkunen | 212/147 |
| 5,160,056 | 11/1992 | Yoshimatsu et al. | 212/155 |
| 5,219,420 | 6/1993 | Kiiski et al. | 212/147 |
| 5,282,136 | 1/1994 | Zui et al. | 364/424.07 |

FOREIGN PATENT DOCUMENTS

| | | |
|---|---|---|
| 2-28493 | 1/1990 | Japan . |
| 2-132097 | 5/1990 | Japan . |

OTHER PUBLICATIONS

Noakes et al., *Proceedings, 38th Conf. on Remote Systems Technology,* "An Application of Oscillation Damped Motion of rSuspended Pyaloads to the Advanced Integrated Maintenance System", 1990, vol. 1, pp. 63–68.

AAB Group, "Shorter unloading times for grab handling portal cranes", date unknown.

Ridout, *Electric Energy Conference 1987,* "New Feedback Control System for Overhead Cranes", Oct. 1987, pp. 135–140.

Ridout, *Journal of Electrical and Electronics Engineering Australia,* "Anti–Swing Control of the Overhead Crane Using Linear Feedback", Mar./Jun. 1989, vol. 9, vol. ½, pp. 17–26.

Ridout, *1989 IEEE,* "Variably Damped Swing Control of the Overhead Crane", pp. 263–269.

Marttinen, "Pole–Placement Control of a Pilot Gantry", pp. 2824–2826. date unknown.

Virkkunen et al., "Computer Control of a Loading Bridge", pp. 484–488. date unknown.

Vähä, "Conventional and Optimal Control in Swing–Free Transfer of Suspended Load", pp. 1–5. date unknown.

Marttinen et al., *IEEE Transactions on Education,* "Control Study with a Pilot Crane", vol. 33, No. 3, Aug. 1990, pp. 298–305.

Marttinen et al., *Sähkö 62,* "Pilot Crane Control", 1989, vol. 11, pp. 22–26.

Marttinen et al., "Control Application of a Trolley Crane", pp. 630–633. date unknown.

*Primary Examiner*—James P. Trammell

*Attorney, Agent, or Firm*—Nikaido Marmelstein Murray & Oram LLP

[57] ABSTRACT

A method for removing the oscillation and reducing the position error of a load carried by an industrial crane comprising: a non-oscillation control algorithm which provides the trolley and load system with sufficient damping in order to remove the oscillations of the load by adjusting the trolley velocity in accordance with the oscillation angle of the load measured by an angle measuring device, a position control algorithm which controls the load to stop at the exact destination by generating the crane velocity proportional to the error between desired and actual positions, and a velocity paten plan algorithm which establishes the overall trolley velocity including a two-stage linear and parabolic deceleration of the trolley in accordance with the desired position and the applying time passed on the above two algorithms. These algorithms are stored in the computer memory and are sequentially applied. Therefore, even if the operator is ignorant of the complicated algorithm, the controls are automatically carried out by a computer.

5 Claims, 7 Drawing Sheets

VELOCITY CONTROL METHOD FOR PREVENTING OSCILLATIONS IN CRANE

FIELD OF THE INVENTION

The present invention relates to a velocity control method for preventing oscillations in a crane. That is, the present invention provides a method for speedily damping the oscillations of the carrying object of a crane.

BACKGROUND OF THE INVENTION

When carrying an object by a crane, a rope extends from a driving motor which drives a trolley, and the object is suspended on the rope. During such a carriage, the object suspended on the rope is oscillated, with the result that the work efficiency and the working safety are aggravated.

That is, the oscillations of the object carried may collide with a worker, thereby causing an accident. Further, when stopping the trolley for unloading of the object, the object may oscillate continuously. Therefore, the operator either should wait until the oscillations stop, or another worker should hold the object to stop the oscillations of the object.

In a prior art, the following method has been proposed for eliminating the oscillations of the object in a crane operation. In Japan, there has been proposed a method such that, during the carrying, an open circuit is used to adjust the acceleration and deceleration patterns, and, after the stop of the crane, a closed circuit is used to remove the oscillations. In this method, an open circuit is used during a carrying, and therefore, when an external disturbance exists such as the occurrence of a collision and the blowing of wind, a perfect oscillation control cannot be assured.

Besides, there is in Japan a purge estimation theory in which the oscillations of the object are not controlled during the carrying, but the oscillations are damped upon stopping of the crane. In this method also, the oscillations are controlled during the carrying, and therefore, the oscillation control is not perfect as in the case of the former.

In Finland, there is a method in which a computer varies the control sampling time in accordance with the variation of the length of the rope, thereby forming an algorithm for damping the oscillations of the object. According to this method, a closed circuit is applied during the carrying, with the result that the oscillation control is carried out in an acceptable manner. However, after the carrying, a position controller is not employed, with the result that a precise position control cannot be realized.

SUMMARY OF THE INVENTION

The object of the present invention is to provide a velocity control method for preventing the oscillations in a crane, in which: a closed circuit is applied during the carrying for feeding back the oscillations of the object so as to quickly damping them; a damping method taking the form of first and second stages is adopted after the stop so as for the object to arrive at the destination without oscillations; and the destination is controlled before the stopping so as to precisely control the carrying distance.

The present invention aims at improving the work efficiency of the crane operation in factories, automatic warehouses and atomic power plants in which safety is required.

Thus, according to the present invention, there are provided a method for eliminating the oscillations in the initial stage of the carriage, and also provided a method for precisely controlling the carrying position which is the greatest object of the crane carriage.

In achieving the above object, the method according to the present invention is characterized in that: the oscillations of the object are fed back into a computer with real time; the accelerations of the trolley in the longitudinal and lateral directions are automatically computed by a computer program in accordance with the gradient of the oscillation angles; then the motor for driving the trolley which is connected to the computer is driven in accordance with the computed acceleration so as to automatically remove the generated oscillations; the paths of the acceleration and deceleration are automatically set in accordance with the carrying position, velocity and the degrees of the oscillations so as to carry the object to the exact destination.

BRIEF DESCRIPTION OF THE DRAWINGS

The above object and other advantages of the present invention will become more apparent by describing in detail the preferred embodiment of the present invention with reference to the attached drawings in which:

FIGS. 6*a* and 6*b* illustrate the oscillation control characteristics in an open circuit control method in which:

FIG. 6*a* illustrates the input velocity path over time; and

FIG. 6*b* illustrates the variations of the oscillations over time;

FIGS. 7*a* and 7*b* illustrate the oscillation control characteristics for the case where a collision has occurred on the object in the open circuit method in which:

FIG. 7*a* illustrates the input velocity path over time; and

FIG. 7*b* illustrates the variations of the oscillations over time; and

FIGS. 8*a* and 8*b* illustrate the oscillation control characteristics for the case where a collision has occurred on the object in a closed circuit control method in which:

FIG. 8*a* illustrates the input velocity path over time; and

FIG. 8*b* illustrates the variations of the oscillations over time.

DESCRIPTION OF THE PREFERRED EMBODIMENT

The present invention is divided roughly into three portions. The first portion is a non-oscillation control algorithm which is a program for quickly removing the already generated oscillations. The second one is a position control algorithm which is a program for controlling the carrying position, so that the object should be stopped at the exact destination. The third one is a carrying velocity path plan algorithm which is a program for automatically setting the overall trolley velocity in accordance with the applying time of the above two algorithms and the given carrying distance. The above algorithms are used by being stored in the memory of a computer. The respective algorithms will be described in detail below.

(4-1) Non-oscillation control algorithm.

Figure 1:
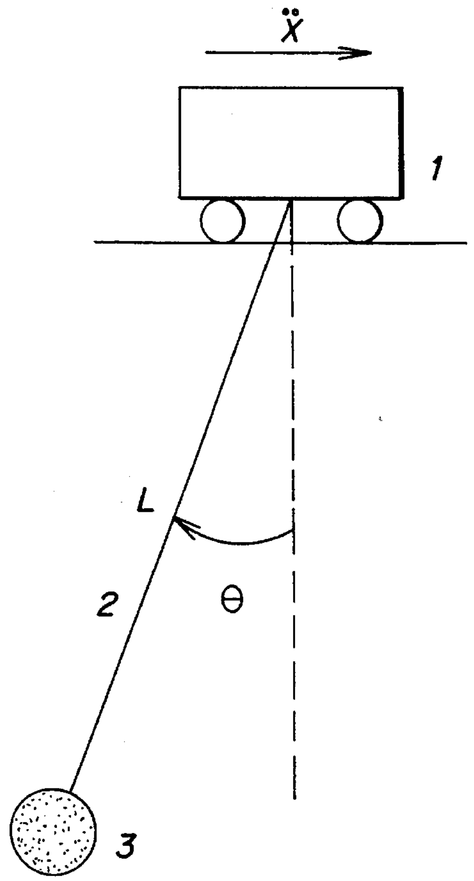
FIG. 1 is a schematic illustration of a crane put on a coordinate system which is adopted in the non-oscillation control method (shows a side view relative to the crane carrying direction)

Referring to FIG. 1, if a trolley 1 advances forward, an object 3 which is suspended on a rope 2 of the crane is forced to be lagged behind, thereby causing oscillations. The relationship between an acceleration $\ddot{x}$ and an oscillation angle θ is defined as follows.

$$L\ddot{\theta}+f\dot{\theta}+g\theta=\ddot{x} \quad (1)$$

where L represents the distance from the hinge point of the rope to the center of gravity of the object, g represents the gravitational acceleration, $\ddot{x}$ represents the carrying acceleration of the trolley, θ, θ and θ represent the oscillation angle, the angular velocity and the angular acceleration respectively, and f represents a damping constant due to the friction at the hinge point. If there is no friction at the hinge point of the rope, then f is 0. In the actual cranes, the damping constant is varied depending on the connecting method of the rope and the number of the ropes (1, 2, 4, 8 and 16), but generally, the damping constant have a value of less than 0.005. In the case where the damping constant is small, an object once begins oscillations, the oscillations will continue over a long time. Therefore, in Formula (1) above, if the acceleration $\ddot{x}$ is so controlled as to be proportionate to the oscillation angular velocity $\dot{\theta}$ as in Formula (2) below, then the damping constant can be artificially increased.

$$\ddot{x}=-k\dot{\theta}+\theta_d \quad (2)$$

where $\theta_d$ equals to 0.

In the above formula, k represents a non-oscillation control gain having a positive value, and $\theta_d$ represents the desired oscillation angle which has a value of 0 if the oscillations are to be removed.

If Formula (2) is substituted into Formula (1), the following formula is obtained.

$$L\ddot{\theta}+(f+k)\dot{\theta}+g\theta=0 \quad (3)$$

Figure 2A:
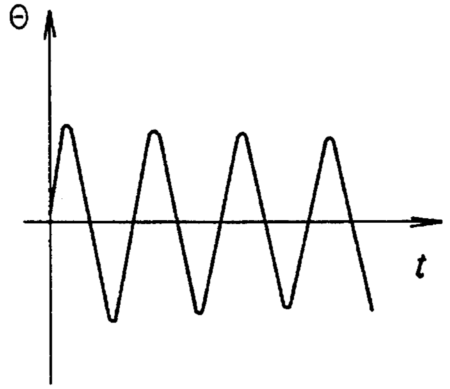
FIGS. 2(*a*), 2(*b*), and 2(*c*) illustrate the oscillation characteristics of the object in accordance with the variations of the oscillation control gain (illustrates the variations of the oscillation angles versus time)
Figure 2B:
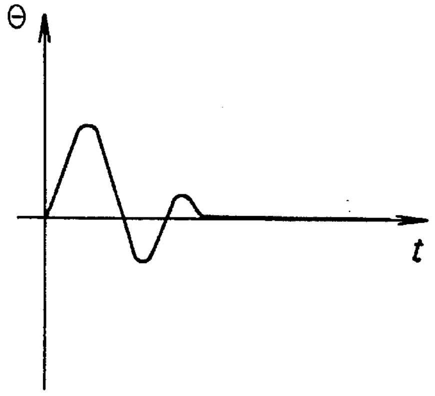
Figure 2C:
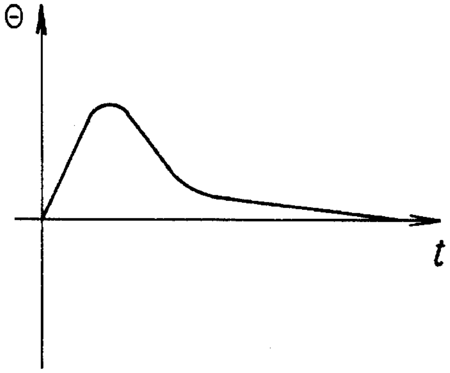

In Formula (3), the term (f+k) is a new damping constant. If the non-oscillation control gain k is made to be sufficiently large, the oscillations can be speedily damped as shown in FIG. 2*b*. However, if the non-oscillation control gain k is too large, although the oscillations are removed, the time for completely removing (θ=0) the oscillations is extended. Further, in this case, the acceleration $\ddot{x}$ of the trolley is made to be large, and therefore, there is the possibility that the trolley is abruptly violently accelerated. Accordingly, in order to obtain the optimum damping effect, the non-oscillation control gain is set as follows.

$$k=2\times(0.5\sim0.7)\sqrt{gL}-f \quad (4)$$

If the non-oscillation control algorithm of Formula (2) is altered for applying it to the digital control device of a computer, Formula (5) is obtained.

$$\dot{x}(n\Delta T)-\dot{x}[(n-1)\Delta T]=-k[\theta(n\Delta T)-\theta\{(n-1)\Delta T\}]$$

or $$\dot{x}(n)=\dot{x}(n-1)-k[\theta(n)-\theta(n-1)] \quad (5)$$

In the above formula, nΔT indicates the time for the nth sampling from the start of the control. The sampling time ΔT is made to be about 1/10 or 1/20 of the oscillation period T, and is made to be larger than the stabilizing time $T_s$ of the electric motor. That is, $$T_s<\Delta T<\frac{T}{10\sim20} \quad (6)$$

Figure 3A:
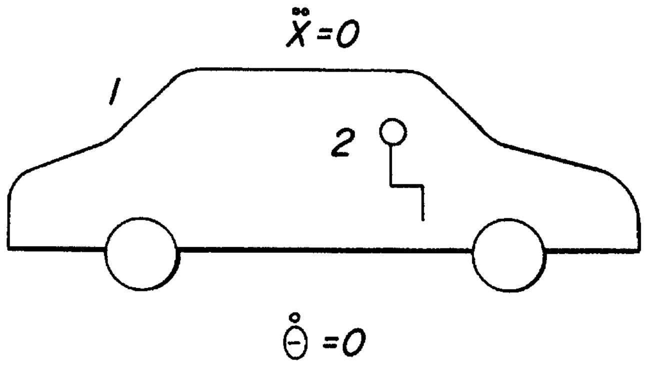
FIGS. 3(*a*), 3(*b*) and 3(*c*) illustrate the acceleration and deceleration of an automobile versus the forced direction of the driver for illustrating the acceleration and deceleration of a trolley versus the forced direction of the object (illustrates a side view relative to the running direction of an automobile)
Figure 3B:
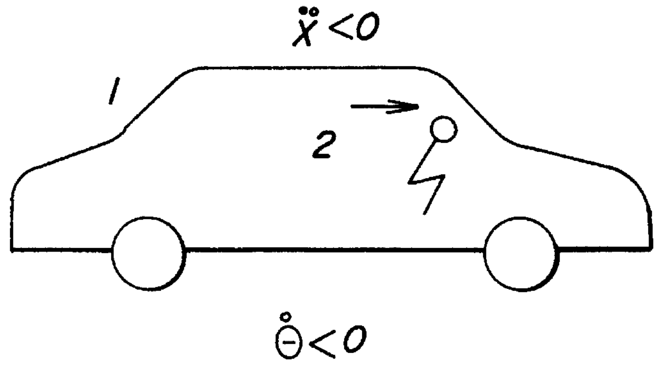
Figure 3C:
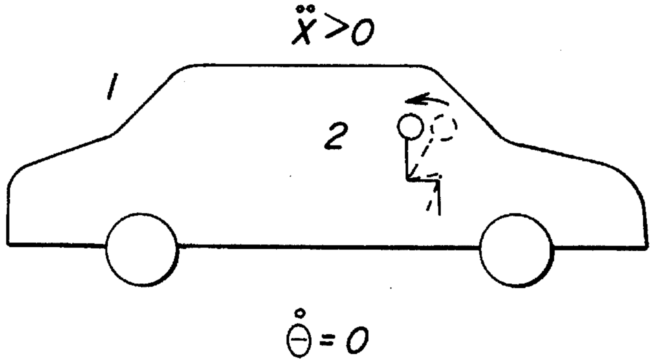

In the present invention, Formula (2) and Formula (5) are named a non-oscillation control algorithm and a digital non-oscillation control algorithm respectively. The physical meaning of Formula (2) is as follows. That is, when the oscillation angular velocity is smaller than 0 ($\dot{\theta}<0$, that is, the object begins to be moved forward in the coordinate system of FIG. 1), the acceleration $\ddot{x}$ is decided to be larger than 0 according to the non-oscillation control algorithm of Formula (2). That is, when the object moves forward, the trolley is accelerated to inhibit the forward moving trend of the object. For facilitation of understanding, FIG. 3 illustrates the relationship between the acceleration and deceleration of an automobile and the forced posture of the driver. That is, as shown in FIG. 3*a*, when the automobile runs at a constant velocity ($\ddot{x}=0$), the body of the driver is not accelerated or decelerated, so that the driver would not be forced forward or backward (θ=0). Then as shown in FIG. 3*b*, if the driver presses the brake pedal ($\ddot{x}<0$), then the body of the driver will be forced forward (θ<0). If such a forcedness of the body is to be eliminated, the driver may press the brake pedal smoothly ($\ddot{x}>0$). In this case, the body of the driver is forced backward owing to the reaction of the advancement of the automobile, thereby preventing the forward forcing of the body of the driver.

The above non-oscillation control method can be briefly summarized as follows. The oscillation angle of the rope or the object is measured with real time, and then, based on this, the electric motor for the trolley is driven in accordance with the computed velocity of the non-oscillation control algorithm of Formula (5), so that the oscillations of the object can be quickly damped. The non-oscillation control gain k of Formula (5) is determined based on Formula (4), while the sampling time ΔT of Formula (5) is determined based on Formula (6).

(4-2) Position control algorithm.

The non-oscillation control algorithm of Formula (5) is capable of quickly damping the oscillation angle of the rope. However, the carrying velocity of the crane is decided arbitrarily by the oscillation angle of the rope, and therefore, the object cannot be carried exactly from the starting position to the destination. Accordingly, the non-oscillation control algorithm should be used in combination with the position control algorithm which is capable of controlling the carrying position of the object. The non-oscillation control algorithm is implemented by controlling the carrying velocity $\dot{x}$. Therefore, in the position control apparatus, the control input parameter should be set in the same manner as the carrying velocity, so that the control system may have an advantage in the safety. Accordingly, the position control algorithm is constituted such that the carrying velocity is varied proportionately to the difference (carrying error) between the actual carrying position and the final carrying position.

$$\dot{x}_d(n)=k_p[x_d-x(n-1)] \quad (7)$$

where $\dot{x}_d$(n) represents the input velocity at the nth sampling time, $x_d$ represents the final carrying position, x(n−1) represents the position of the trolley at the (n−1)th sampling time, and $k_p$ is a position control gain having a positive value.

In the case where the current carrying position has not reached the final carrying position (the case where the carrying error is positive), it shows that the trolley has to be made further advanced in the running direction ($\dot{x}_d(n)>0$). On the other hand, in the case where the current position has passed the intended position (the case where the carrying error is negative), it shows that the trolley has to be moved in the reverse direction ($\dot{x}_d(n)<0$). The value of $k_p$ is set to about 0.5, but if the value of $k_p$ is large, then the value of $\dot{x}_d(k)$ which decided by Formula (7) is also made to be large. Therefore, the carrying velocity is made to be large, so that oscillations may occur. On the other hand, if the value of $k_p$ is small, the position control effect is lowered, so that the position error may be large when the trolley finally has stopped. Therefore, the value of $k_p$ should be set to the optimum level after performing experiments.

(4-3) Carrying velocity path plan algorithm.

If the non-oscillation controller of Formula (5) and the position controller of Formula (7) are properly used, the oscillations of the object and the carrying position error can be simultaneously removed. If a non-oscillation crane is looked into from the view point of controls, two control outputs (oscillation angle and carrying displacement of crane) for one control input (carrying velocity) have to be produced, and therefore, two controllers have to be sequentially used.

Therefore, according to the present invention, in order to maximize the non-oscillation and the position control effect, the time points for the use of the two controllers are differentiated in accordance with the variations of the oscillations, the carrying velocity, and the carrying position. Further, the operator is not required to understand the complicated algorithm, but the final position has only to be commanded, so that the control time for the carrying velocity and the magnitude of carrying velocity should be automatically decided in accordance with the different situations.

Figure 4:
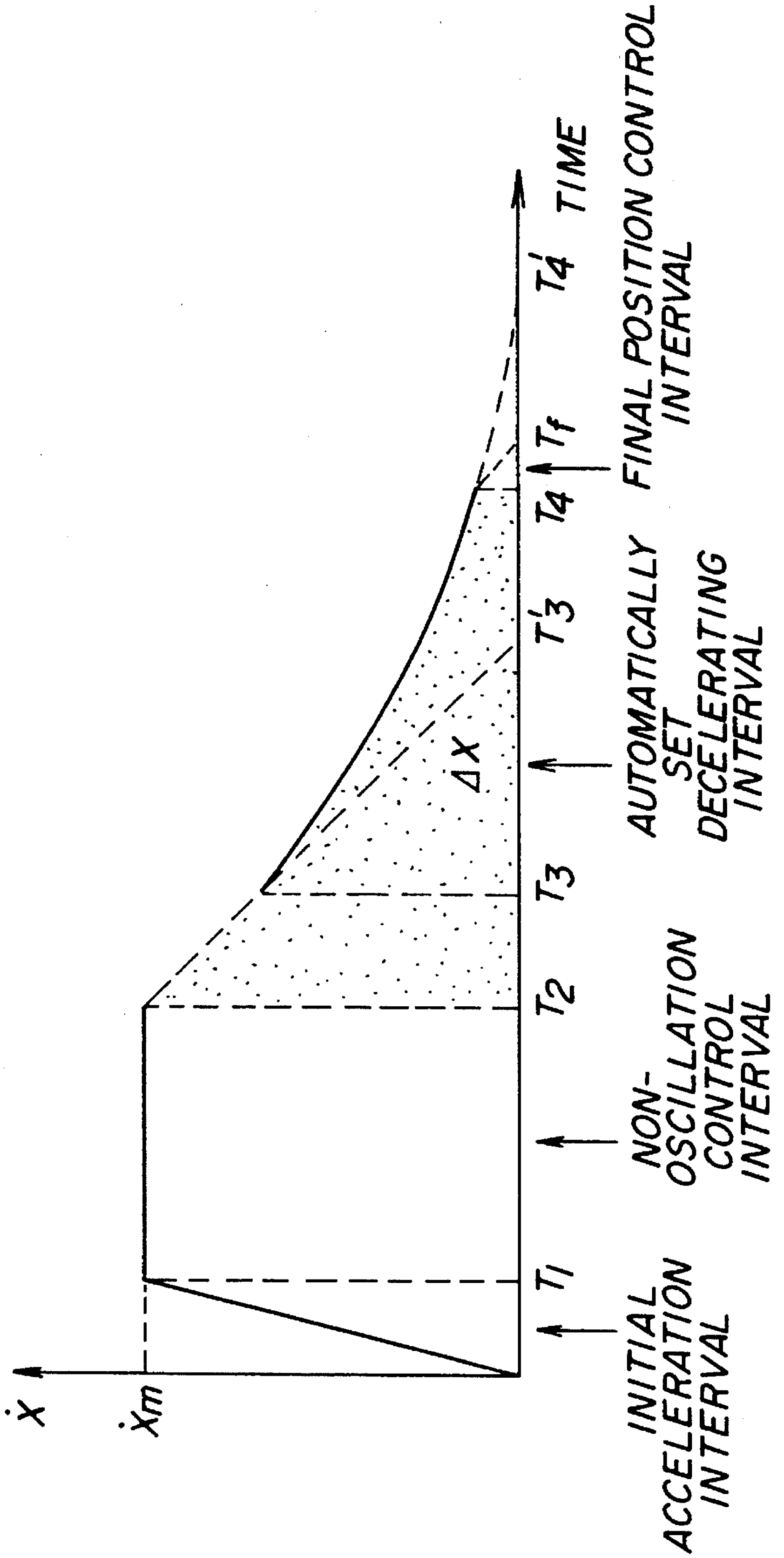
FIG. 4 illustrates the path of the carrying velocity of a crane over time.

When the final carrying position $x_d$ and the length of the rope L are decided, the carrying velocity path plan relative to time is set as shown in FIG. 4. The graph of FIG. 4 is automatically drawn by a digital device of a computer during the carrying of the object. Therefore, the operator of the computer has only to enter the final carrying position $x_d$.

The carrying velocity path plan of FIG. 4 includes: an initial accelerating interval (until $t=T_1$) for accelerating the object to a certain velocity after starting the carrying of the object (at t=0); a non-oscillation control interval (until $t=T_2$) for removing the oscillations which have occurred by the acceleration; an automatically set decelerating interval (until $t=T_3$) having a first stage linear steep deceleration interval and a second stage parabolic deceleration interval for sufficiently decelerating the trolley after eliminating the oscillations and before using the position controller; and a position controlling interval (until $t=T_f$) for finally eliminating the position error.

Figure 5:
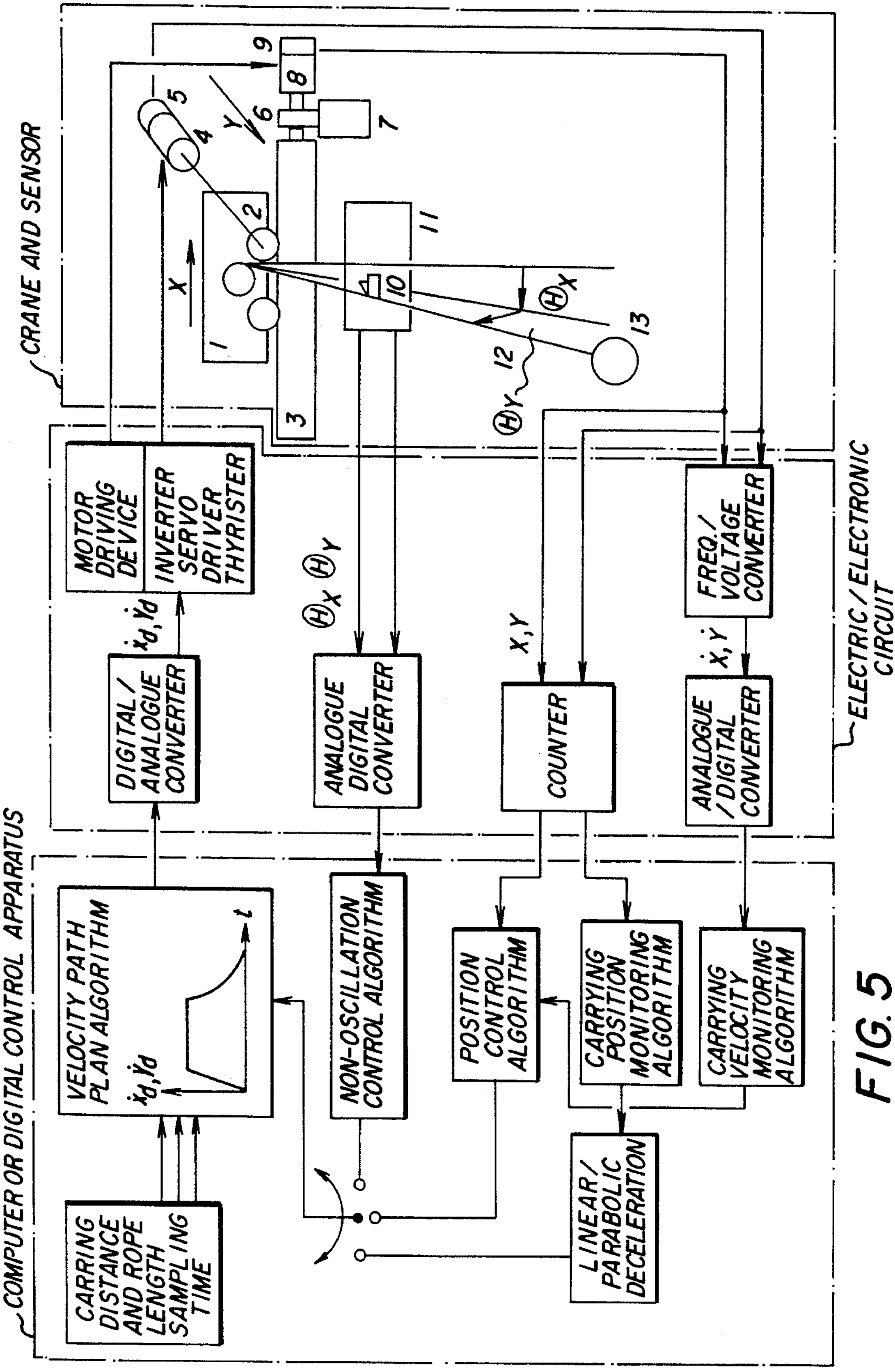
FIG. 5 illustrates the constitution of a non-oscillation crane.

The non-oscillation control algorithm, the position control algorithm and the velocity path plan algorithm described above are the programs which are implemented by the digital device of a computer. If such programs are to be applied to a crane, a mechanical/electrical circuit as shown in FIG. 5 is required.

The total constitution of such a circuit is divided into three divisions. The first is the non-oscillation, position control and velocity path plan algorithms which are implemented by the digital device of a computer, and which are the major feature of the present invention. The second is various electric/electronic circuits which are for electrically connecting the crane and its sensor sections to the computer. The third is a crane which is to be subjected to a non-oscillation control. The above divisions will be described as follows.

(5-1) Crane and sensor sections

The principle of the driving of a crane is generally such that wheels 2 which are attached on a trolley 1 is rotated by a driving motor 4, and the trolley i moves over a rail or girder 3 or suspended to a lateral rail or girder 3 in the direction of an X axis. Similarly, wheels 6 which are installed on the ends of the rail or girder are driven by a driving motor 8 to move over a running rail 7 in the direction of a Y axis.

Under this condition, generally the driving motor is an induction motor, and depending on circumstance, a servo motor or a dc motor is used. When the trolley moves in the X and Y directions, an object 13 which is suspended on a rope 12 of the trolley is oscillated in the X and Y directions. In the present invention, an oscillating angle measuring apparatus 11 (which has been filed as a patent application) using a laser sensor 10 is made to measure the oscillation angles $\theta_x$ and $\theta_y$. These measured values are fed back to a computer through electric/electronic circuits.

Simultaneously with such a non-oscillation control method, encoders 5 and 9 are attached on the motor to measure the revolutions of the motor and to ultimately control the carrying position (x,y) of the trolley in an accurate manner. The revolution value thus obtained is fed back to a computer to apply it to the position control algorithm. Besides the encoders, a variable resistor (potentiometer) or a tachogenerator can be used as the revolution measuring device. The carrying velocities $\dot{x}$ and $\dot{y}$ of the trolley in the X and Y directions are fed back to a computer after converting the frequency of the output pulses of the encoder to a voltage, to use the data for a carrying velocity monitoring algorithm.

(5-2) Electric/electronic circuit.

The electric/electronic circuits play roles such that they feed back the output signals of the various sensors attached on the crane, and that they transmit the motor driving signals $\dot{x}_d$ and $\dot{y}_d$ of the algorithms of the computer to the motor driving device. They are composed of the following electric/electronic circuits. The output signals of the laser sensor 10 of the angle measuring apparatus 11 are fed back through an analogue/digital converter to a computer in the form of numerals to be used on the non-oscillation algorithm. The output pulses of the encoder are counted by a counter to use it on the position control algorithm. Further, these data are converted into a carrying velocity voltage output by a frequency/velocity converter, so that these converted data can be used on the position control algorithm and the carrying position/velocity monitoring algorithms. Further, the carrying velocities $\dot{x}_d$ and $\dot{y}_d$ which are computed by the velocity path plan algorithm of the computer are outputted to the motor driving device by a digital/analogue converter, so that the motor should be driven at the computed velocity. Here, as the motor driving device, an invertor, a servo driver and a thyrister can be selectively used depending on the kind of the motor used, i.e., depending on the kinds of induction motor, servo motor, and dc motor.

(5-3) Velocity path plan algorithm.

The velocity path plan algorithm which is the major feature of the present invention is composed of a non-oscillation control algorithm, a position control algorithm, a linear/parabolic deceleration control algorithm, and a carrying position/velocity monitoring algorithm. These are the programs which are used in a computer or a digital control apparatus.

First, the operator inputs the intended carrying distance, the length of the rope, and the sampling time into the program. Then the carrying velocity path plan algorithm computes the initial acceleration, and uses the non-oscillation control algorithm, the linear/parabolic deceleration algorithm and the position control algorithm to compute the intended velocities $\dot{x}_d$ and $\dot{y}_d$ of the motor.

The above algorithms are stored as programs in the computer or the digital devices to carry out the functions in an automatic manner.

EXAMPLES (1) In the automatically set deceleration intervals of FIG. 4, the second order deceleration path having the form of linear line and parabola can be modified to a first order deceleration path taking the form of a linear deceleration or parabolic deceleration. That is, the second order deceleration path undergoes a steep deceleration and a gentle deceleration in the sequential manner, with the result that a fast carrying time and an oscillation prevention effect st the time of stop can be obtained. However, the method for establishing the path plan is very much complicated. Therefore, only one of the linear and parabolic decelerations can be selected.

(2) In the above description, if the acceleration, the non-oscillation control, the linear steep deceleration, the parabolic gentle deceleration and the final position control are to be carried out, the final carrying position $x_d$ should be considerably large.

If the final carrying position $x_d$ is smaller than the distance $\Delta_x$ which is to be carried in the deceleration interval, then the difference $x_d-\Delta_d$ (the distance to be carried within the acceleration and non-oscillation control interval) becomes negative. Therefore it means that the trolley has to be moved reversely in the initial acceleration and non-oscillation control intervals. However, the trolley has to be actually moved toward the final destination, and therefore, the above method is not applicable to the actual cases.

Therefore, in the case where $\Delta_x$ is larger than $x_d$, the above method cannot be applied. In such a case, the following method has to be applied.

That is, the trolley is carried to the final setting destination without carrying out the non-oscillation control. Then the oscillations of the object which have occurred at the stopping of the final setting destination is removed by carrying out a non-oscillation control. Then when the oscillations are damped to a certain degree, the position controller is driven again.

In this method, because the non-oscillation control is not carried out during the carrying, the oscillations exist all the time. Therefore, a high acceleration cannot be performed, and therefore, the carrying time is increased. Further, at the final setting destination, the oscillations can be controlled through the non-oscillation control, but, during the non-oscillation control, the trolley moves, so that position error would occur. If the position controller is activated to remove the position error, although the position error is reduced, the trolley is subjected to variations of acceleration and deceleration, so that oscillations should occur again. Therefore, after performing the position control, the non-oscillation controller has to be activated again. That is, in this method, after stopping the object, a non-oscillation control, a position control, a non-oscillation control and a position control have to be repeatedly carried out until the oscillations and the carrying error are reduced to satisfactory values. Therefore there is the disadvantage that the time for carrying out the non-oscillation control and the position control is extended. Therefore, in the case where this method is applied, the oscillations and the position errors should be permitted to a certain degree, so that the carrying time should be shortened.

According to the present invention, the oscillations of the object can be removed during the carrying or during stationary state, and the final destination can also be accurately controlled by applying a closed circuit. Thus the present invention can obtain the following effects.

(a) Elimination of collision with the operator or another object and shortening of unloading time.

If the object is to be protected from impact at the destination, the object should not be oscillated. However, in the conventional crane, this cannot be controlled, and therefore, it should be waited for a long time until the oscillations are naturally damped (about 40 minutes if the length of the rope of the crane is 3 m). When it cannot be wait for such a long time, the operators hold the object to forcibly damp the oscillations, and in such a case, if the object is large in its mass or bulk, the operators can be hurt. Accordingly, if the present invention is applied, such problems are essentially overcome.

(b) Assuring of safety which is not affected by the external conditions.

There is a prior art in which an open circuit is used to overcome the disadvantages of the conventional crane (uncontrolled crane). In this method of the prior art, the oscillation angle of the rope is not measured, but only uses an oscillation period ($T=\sqrt{lg}$) which is computed based on the length of the rope. Therefore, if there is an external influence (such as a collision with a nearby object or oscillations due to winds in a harbor), then the oscillation characteristics based on the pre-set velocity path plan is aggravated, and therefore, the safety is not assured. However, in the present invention, the variation of the oscillation of the object due to the external influence is measured and controlled, so that the oscillation control characteristics should not be altered by the external influence, and that always a constant characteristics should be maintained. This was confirmed through experiments as follows.

(i) Performance of the open circuit control method.

Figure 6A:
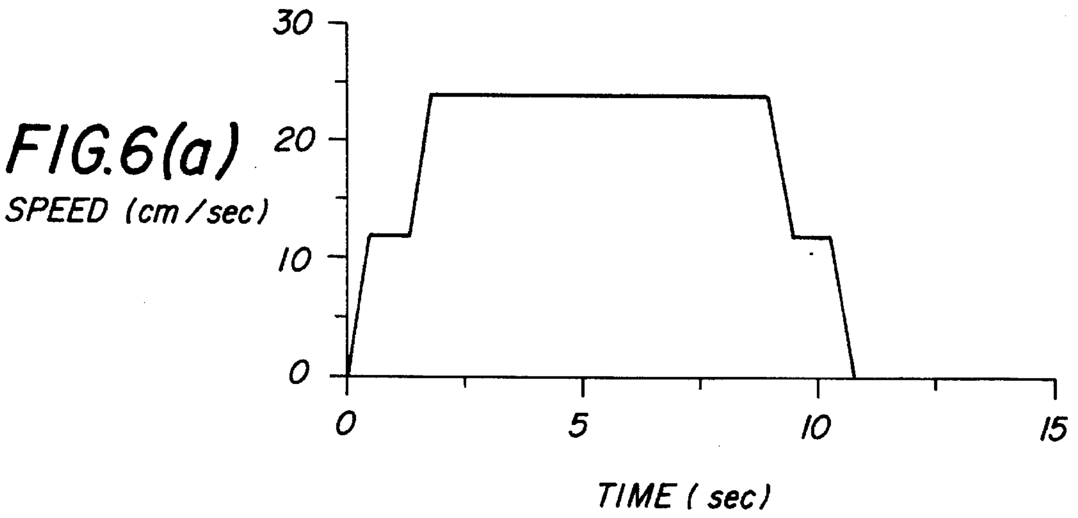
Figure 6B:
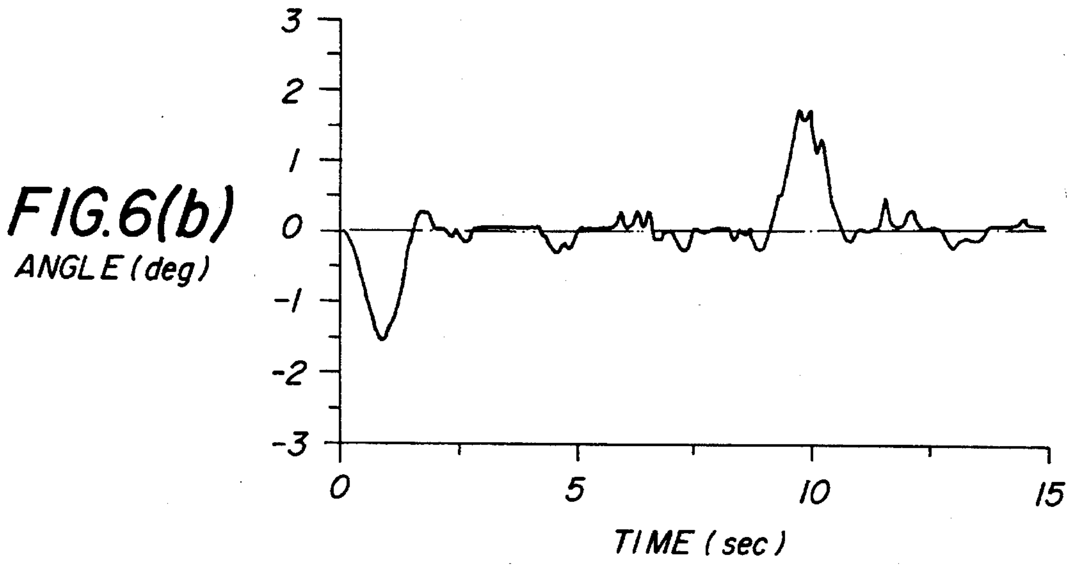

In order to evaluate the performance of the open circuit control method, a rope length L was decided, and a velocity path plan was established. In accordance with the path plan, an object was carried, and the oscillation angle of the object was measured. As shown in FIG. 6*a*, the velocity path plan included a two-stage velocity variation. The oscillation control characteristics are as shown in FIG. 6*b*. The oscillations of the object due to the initial acceleration were removed soon by a second acceleration, so that the non-oscillation state should be continued. Then oscillations occurred at the time of the stopping, but these oscillations were removed by a second deceleration.

(ii) Lowering of the performance of the open circuit control method due to an external disturbance.

Figure 7A:
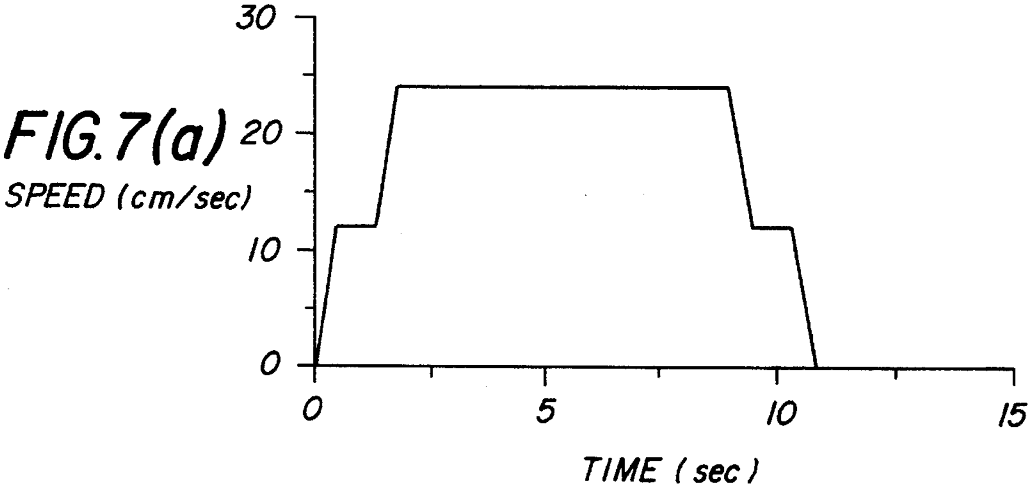
Figure 7B:
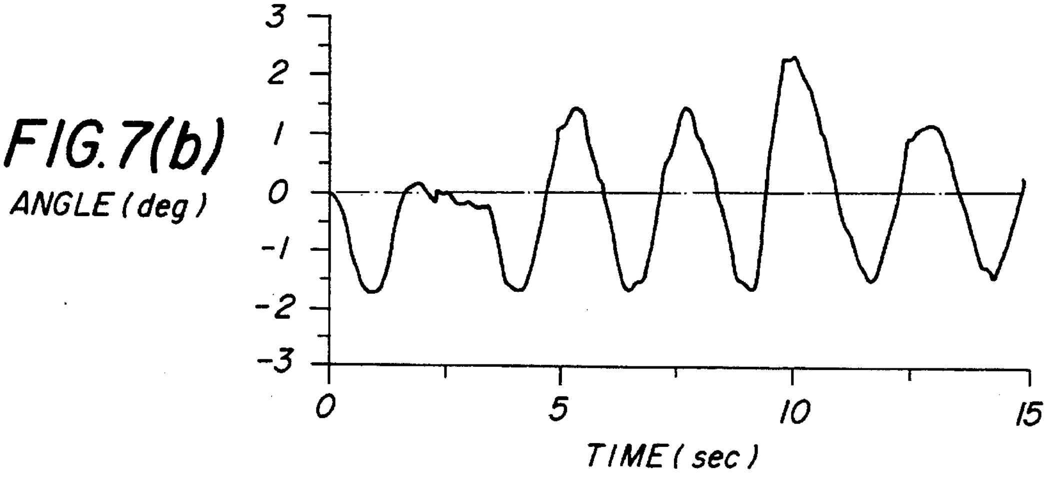

In order to evaluate the control characteristics of the open circuit method as against an external disturbance, the object was made to be collided with another object during the carrying. In this experiment, the velocity, path plan, the length of the rope, and the final destination were same as those of FIG. 6*a*. The results of this experiment are as shown in FIG. 7. That is, as shown in FIG. 7*b*, when the carrying object was made to be collided with another object in 3 seconds, oscillations occurred, and the oscillations was never removed. That is, the open circuit control method shows a superior oscillation control characteristics. However, when an external disturbance is introduced, the performance cannot be assured, resulting in that the safety is jeopardized.

(iii) Performance of the closed control circuit according to the present invention.

Figure 8A:
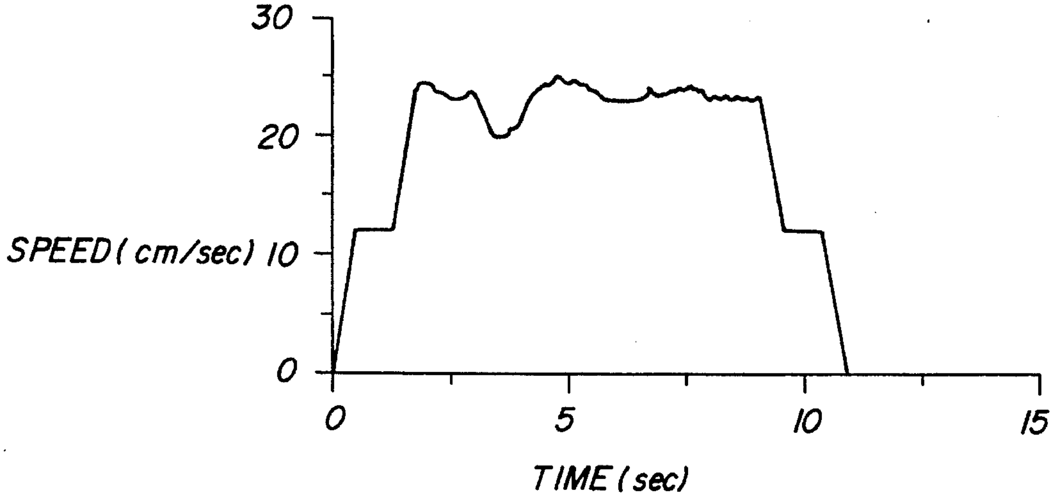
Figure 8B:
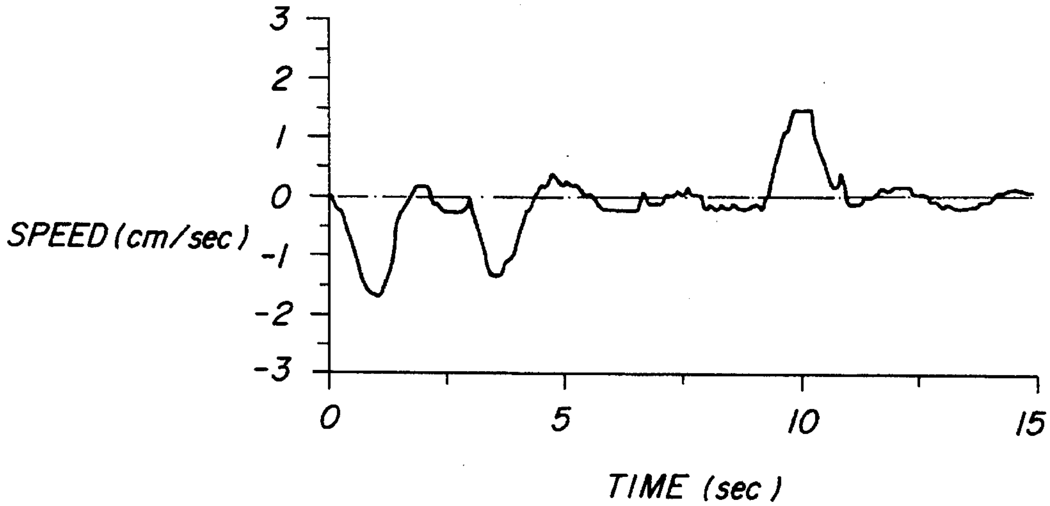

In order to evaluate the performance of the closed control circuit of the present invention having the velocity path plan and having a non-oscillation controller, an experiment was carried out under the same conditions as those of the experiment for the open circuit control method of the conventional technique. The results of the experiment are as shown in FIG. 8. The basic velocity path plan of FIG. 8*a* was same as that of the open circuit control method, except that the non-oscillation controller was driven in the highest velocity interval. As shown in FIG. 8*b*, the oscillations of the object which were generated at about 3 seconds by a collision were quickly damped. Therefore the closed circuit method according to the present invention removes the external disturbances, so that the non-oscillation control characteristics should be assured under any condition. If the actual field conditions such as winds and collisions are taken into account, the closed circuit control method according to the present invention can be safely used compared with the open circuit control method of the conventional technique.

What is claimed is:

1. A velocity control method for preventing oscillations in a crane using a computer or a digital control apparatus for removing oscillation, comprising:

measuring oscillation angle, velocity, and position by means of a two-dimensional velocity and position measuring device and by means of a two-dimensional oscillation angle measuring device:

feeding the measured data to a computer and the like to drive an electric motor for a trolley in accordance with the computed velocity based on a digital non-oscillation control algorithm as follows, $\dot{x}(n)=\dot{x}(n-1)-k[\theta(n)-\theta(n-1)]$, wherein, $\dot{x}(n)$ is the input velocity at nth sampling time $\Delta T$ from the start of control;

$\dot{x}(n-1)$ is the velocity of the trolley at (n−1)th sampling time;

$\theta n)$ and $\theta(n-1)$ are actual oscillation angles at nth and (n−1)th sampling time respectively; and k is a non-oscillation control gain; or $\dot{x}(n\Delta T)-\dot{x}[(n-1)\Delta]=-k\{\theta(n\Delta T)-\theta[(n-1)\Delta T]\}$wherein, $n\Delta T$ is a time for the nth sampling from the start of the control;

a sampling time is determined based on $$T_s < \Delta T < \frac{T}{10\sim 20}$$

wherein, $T_s$ is a stabilizing time of an electric motor which is approximately same as the time when the actual velocity of motor becomes same with the input velocity; and T is the oscillation period of the load;

a control gain k is determined based on $k=2\times(0.5\sim 0.7)gL-f$ wherein, g is the gravitational acceleration;

L is a distance from a hinge point of a rope to a center of gravity of an object; and f is a damping constant due to the friction at the hinged point of rope.

2. The velocity control method as claimed in claim 1, further compromising: establishing a velocity path plan in the order of an initial acceleration of said trolley; a velocity control based on a non-oscillation control algorithm as claimed in claim 1; a linear deceleration or a parabolic deceleration; and the final position control, thereby driving said trolley.

3. The velocity control method as claimed in claim 2, wherein said velocity path plan is established in such a manner that a linear deceleration is selected.

4. The velocity control method as claimed in claim 2, wherein said velocity plan is established in such a manner that a parabolic deceleration is selected.

5. A velocity control method for preventing oscillation in a crane using a computer or a digital control apparatus for non-oscillation, comprising:

decelerating a trolley in a linear steep deceleration and a parabolic deceleration after a non-oscillation control, so as to follow a given reference velocity, while maintaining the same speed and deceleration at switching instance of said linear steep and parabolic deceleration such that oscillations are not generated at the switching instance so as to carry out an accurate position control and so as to shorten the carrying time.

* * * * *